United States Patent
Thompson et al.

(10) Patent No.: US 7,461,284 B2
(45) Date of Patent: Dec. 2, 2008

(54) ADAPTIVE ELASTICITY FIFO

(75) Inventors: Timothy D. Thompson, Windsor, CO (US); Christopher D. Paulson, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 711 days.

(21) Appl. No.: 11/157,270

(22) Filed: Jun. 20, 2005

(65) Prior Publication Data

US 2007/0002991 A1    Jan. 4, 2007

(51) Int. Cl.
*G06F 1/00* (2006.01)
*G06F 1/04* (2006.01)
*G06F 1/14* (2006.01)
*G06F 11/00* (2006.01)
G06F 3/00 (2006.01)
G06F 5/00 (2006.01)

(52) U.S. Cl. ........................ 713/500; 713/502; 713/503; 710/52; 710/54; 710/55; 710/56; 710/57

(58) Field of Classification Search .................. 713/500
See application file for complete search history.

(56) References Cited

U.S. PATENT DOCUMENTS 5,623,699 A * 4/1997 Blakeslee ..................... 710/52
6,460,130 B1 * 10/2002 Trull et al. .................... 712/32

\* cited by examiner

*Primary Examiner*—Rehana Perveen
*Assistant Examiner*—Michael J Brown
(74) *Attorney, Agent, or Firm*—Cochran Freund & Young LLC

(57) ABSTRACT

Disclosed is a method for minimizing the buffer size of an elasticity FIFO queue when synchronizing data between two clock domains. Data communication is typically sent by a transmitter device to a receiver device. The transmitted data signal includes an embedded clock signal and null data characters, as specified by the data communication signal protocol. A null character indicates an empty data frame and is included as part of most standard communication protocols. An embodiment skips one or more null characters from the elasticity FIFO queue during a single clock cycle when it is detected that the write pointer is catching up to the read pointer. By skipping multiple null characters during a single write cycle, the read pointer is moved ahead by one or more queue locations and the write pointer is insured to not catch up to the read pointer for a wider variation in frequencies between a transmitter and receiver than is normally possible. Typically, the elasticity FIFO queue size must be increased in order to support a larger frequency variation. By reducing the need to increase the elasticity FIFO queue size, the gate count and area needed for the elasticity FIFO queue on the silicon chip of the receiver is reduced, thus, reducing the cost contribution of the elasticity FIFO queue to the receiver device. Skipping null characters also reduces the latency time between a write and the associated read of a non-null data character.

20 Claims, 7 Drawing Sheets

300 EIGHT LOCATION ELASTICITY FIFO BEFORE & AFTER EMBODIMENT OPERATION

ADAPTIVE ELASTICITY FIFO

BACKGROUND OF THE INVENTION

1. Field of the Invention

The present invention generally pertains to digital electronic communications and more particularly to digital electronic communication signals containing an embedded clock signal.

2. Description of the Background

There are two standard communication models for electronic communications, i.e., serial and parallel. Serial communications send all data along a single communications channel. A parallel communication connection is essentially a group of serial communication channels operating together to provide faster data throughput than is possible with a single serial connection. Most serial communication protocols include Fa clock signal embedded within the communication signal. Parallel communication protocols usually send a separate clock channel for clocking the data. For a serial connection, or for each of the serial channels of a parallel connection, a buffer is typically placed at the input of the receiver in order to synchronize the data received with the clock of the receiver. The input buffer is typically implemented as a First-In, First-Out queue, and is called an elasticity FIFO queue.

The elasticity FIFO queue varies in size based on the speed of the communication channel and any possible differences between the clock speed embedded with the communication signal and the clock speed of the receiver device. The greater the difference in clock speeds of the embedded or received clock of the communication signal and the receiver clock, the larger the elasticity FIFO queue necessary.

Most communication protocols include 'null' characters as a standard part of data transmission. A null character is a data value that indicates an empty data frame that is not intended to carry any data of the data signal. RapidIO, InfiniBand, Advanced Switching Interconnect (ASI), System Packet Interface (SPI), Fibre Channel, Serial Attached SCSI (SAS), and Serial Advanced Technology Attachment (SATA) are examples of modem communication protocols that employ an embedded clock signal and null characters as part of the communication transmission.

Information on the RapidIO specification is kept by the RapidIO Trade Association, 3925 W. Braker Lane, Suite 325, Austin, Tex. 78759 , telephone number 512-305-0070 , and web site www.rapidio.org. RapidIO is a registered trademark of the RapidIO Trade Association.

Information on the InfiniBand specification is kept by the InfiniBand Trade Association, 5440 SW Westgate Drive, Suite 217, Portland, Oreg. 97221 , telephone number 503-291-2565 , and web site www.infinibandta.org. InfiniBand is a registered trademark of System I/O, Inc., doing business as InfiniBand Trade Association.

Information on the Advanced Switching Interconnect (ASI) specification is kept by the Advanced Switching Interconnect SIG, c/o VTM, 5440 SW Westgate Drive, Suite 217, Portland, Oreg. 97221 , telephone number 503-291-2566 , and web site www.infinibandta.org.

Information on the System Packet Interface (SPI) specification is kept by the Optical Internetworking Forum, 39355 California Street, Suite 307 , Fremont, Calif. 94538 , telephone number 510-608-5928.

Information on the Fibre Channel, SAS, SATA, and many other communication specifications are kept by the American National Standards Institute (ANSI). ANSI is located at 11 West 42nd Street, 13 th Floor, New York, N.Y. 10036 , telephone number 212-642-4900, and web site www.ansi.org.

SUMMARY OF THE INVENTION

An embodiment of the present invention may comprise a method of minimizing elasticity FIFO queue size for synchronizing data between two clock domains comprising: writing a data block to a write location specified by a write pointer of the elasticity FIFO queue on each write clock cycle of a write clock; reading the data block from a read location specified by a read pointer of the elasticity FIFO queue on each read clock cycle of a read clock, the read location being behind the write location in the elasticity FIFO queue; and performing adjustment clock tasks on each adjustment clock cycle of an adjustment clock, the adjustment clock tasks further comprising: calculating a separation number of locations between the write pointer and the read pointer, the separation number of locations being a count of locations that the write location would need to catch up to the read location; calculating a correction number of locations, the correction number of locations being the greater of zero and a separation threshold number of locations subtracted from the separation number of locations; searching the elasticity FIFO queue for consecutive null locations, the consecutive null locations starting at the read location and ending at a last consecutive null location, each location of the consecutive null locations containing a null character; and adjusting the read pointer to specify an adjusted read location, the adjusted read location being one location after skipped locations, the skipped locations being a subgroup of the consecutive null locations starting at a first null location of the consecutive null locations and continuing for the lesser of the correction number of locations and a total count of the consecutive locations.

An embodiment of the present invention may further comprise a receiver for minimizing elasticity FIFO queue size for synchronizing data between two clock domains comprising: a write data subsystem that writes a data block to a write location specified by a write pointer of the elasticity FIFO queue on each write clock cycle of a write clock; a read data subsystem that reads the data block from a read location specified by a read pointer of the elasticity FIFO queue on each read clock cycle of a read clock, the read location being behind the write location in the elasticity FIFO queue; and an adjustment clock subsystem that runs each adjustment clock cycle of an adjustment clock, the adjustment clock subsystem further comprising: a calculate separation subsystem that calculates a separation number of locations between the write pointer and the read pointer, the separation number of locations being a count of locations that the write location would need to catch up to the read location; a calculate correction subsystem that calculates a correction number of locations, the correction number of locations being the greater of zero and a separation threshold number of locations subtracted from the separation number of locations; a null search subsystem that searches the elasticity FIFO queue for consecutive null locations, the consecutive null locations starting at the read location and ending at a last consecutive null location, each location of the consecutive null locations containing a null character; and an adjust read pointer subsystem that adjusts the read pointer to specify an adjusted read location, the adjusted read location being one location after skipped locations, the skipped locations being a subgroup of the consecutive null locations starting at a first null location of the consecutive null locations and continuing for the lesser of the correction number of locations and a total count of the consecutive locations.

An embodiment of the present invention may further comprise a receiver for minimizing elasticity FIFO queue size for synchronizing data between two clock domains comprising: means for writing a data block to a write location specified by a write pointer of the elasticity FIFO; means for reading the data block from a read location specified by a read pointer of the elasticity FIFO queue; means for calculating a separation number of locations between the write pointer and the read pointer; means for calculating a correction number of locations for the elasticity FIFO queue; means for searching the elasticity FIFO queue for consecutive null locations; and means for adjusting the read pointer to specify an adjusted read location, the adjusted read location skipping up to the correction number of locations from the consecutive null locations.

DETAILED DESCRIPTION OF THE INVENTION

Figure 1:
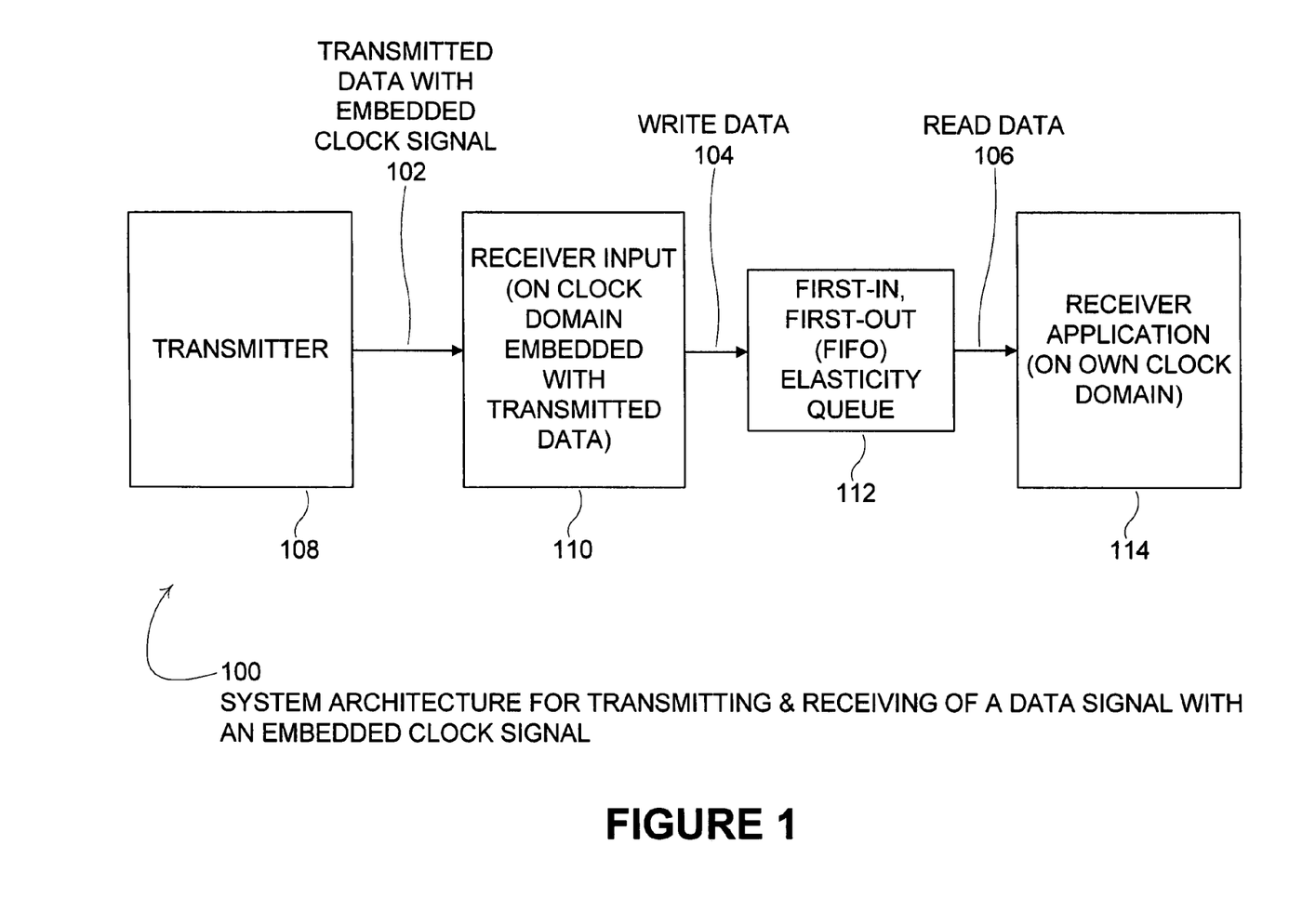
FIG. 1 is a schematic illustration of the system architecture for transmitting and receiving a data signal with an embedded clock signal.

FIG. 1 is a schematic illustration of the system architecture 100 for transmitting and receiving a data signal with an embedded clock signal 102. The transmitter 108 sends a signal 102 to a receiver 114. The transmitted signal 102 has a clock signal embedded onto the signal 102. The receiver input 110 receives the transmitted signal 102 and writes the data 104 to a First-In, First-Out (FIFO) elasticity queue 112. The receiver input 110 writes the data 104 to the elasticity FIFO queue 112 on each clock cycle of the clock embedded with the transmitted data 102. The receiver 114 reads the data from the elasticity FIFO queue 112 on each clock cycle of the receiver 114. The elasticity FIFO queue 112 buffers the transmitted data 102 before the transmitted data 102 is read into the receiver 114.

The transmitted data signal 102 includes null characters on an intermittent basis as defined in the communication protocol. Common communication protocols that include an embedded clock signal and null characters include, but are not limited to: RapidIO, InfiniBand, Advanced Switching Interconnect (ASI), System Packet Interface (SPI), Fibre Channel, Serial Attached SCSI (SAS), and Serial Advanced Technology Attachment (SATA). The elasticity FIFO queue 112 size is based on the speed of the communication channel 102 and any possible differences between the clock speed embedded with the communication signal 102 and the clock speed of the receiver device 114. The higher the communication speed, the larger the elasticity FIFO queue 112 required. Likewise, the greater the difference in clock speeds of the embedded clock of the communication signal 102 and the receiver clock 114, the larger the elasticity FIFO queue 112 required.

Figure 2:
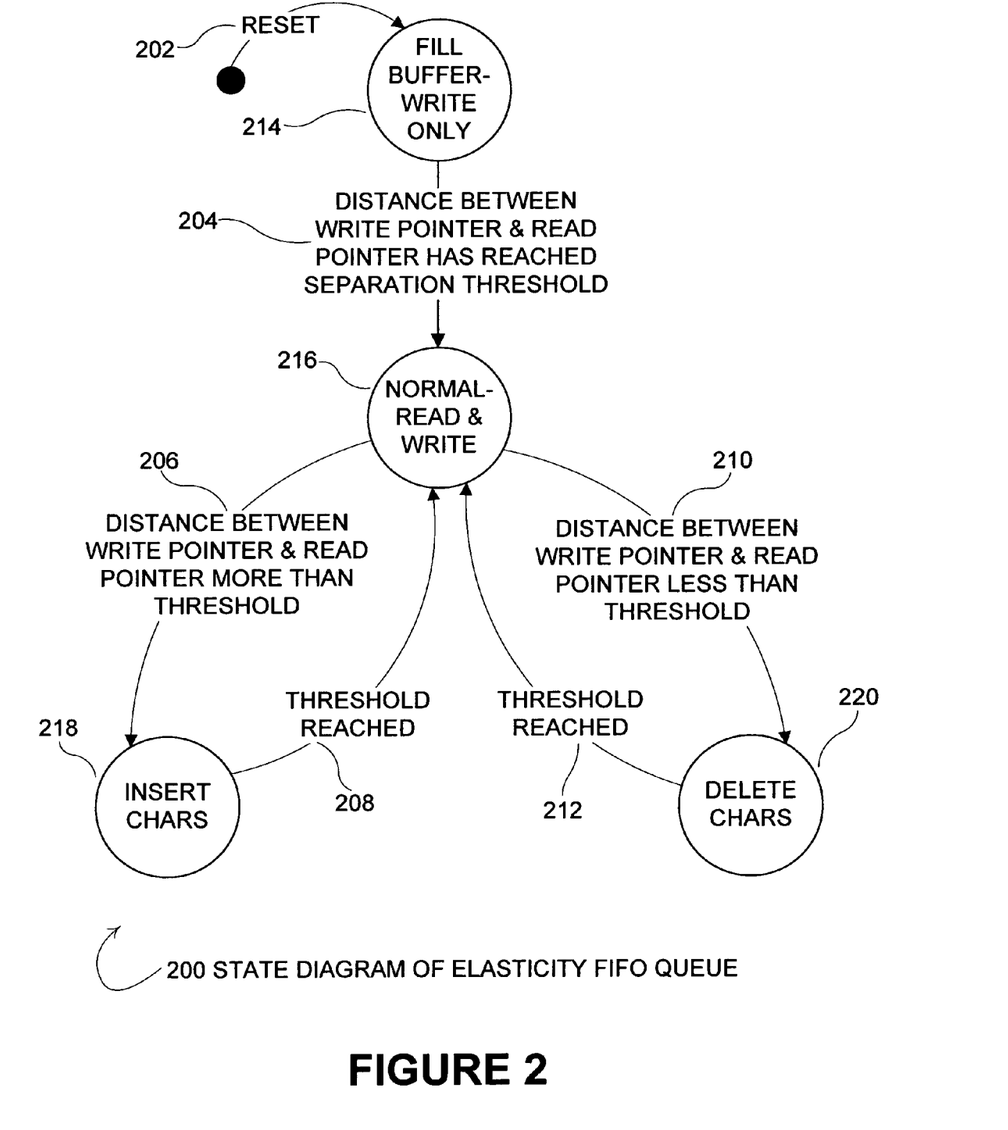
FIG. 2 is a state diagram of an elasticity First-In, First-Out (FIFO) queue.

FIG. 2 is a state diagram 200 of an elasticity FIFO queue. After a system reset 202 caused by a power cycle or user initiated reset the elasticity FIFO queue is written with the transmitted data 214. In the fill buffer state 214, the elasticity FIFO queue is only written with data, and no data is read from the queue. Once a predefined distance, or separation threshold, between the write pointer and the read pointer is reached 204, the elasticity FIFO queue switches to the normal operation state 216 and a data item is written on each write clock cycle and a data item is read on each read clock. Generally, the separation threshold is half the total possible distance between the write pointer and the read pointer possible given the elasticity FIFO queue size. Different embodiments may have a different definition of the separation threshold and any value desired may be used for the separation threshold. For standard communication protocols, the write clock is the clock embedded with the communication signal and the read clock is the clock of the receiver device. When the distance between the write pointer and the read pointer becomes less than the separation threshold 210 the system changes to a state that deletes unnecessary characters 220. In the delete characters state 220, the read pointer skips over elasticity queue locations holding null characters so that the read pointer can catch up with the write pointer. Once enough null characters are deleted from the elasticity FIFO queue for the distance between the read and write pointers to return to the separation threshold 212, the system returns to the previously defined normal operational state 216. If the distance between the write pointer and the read pointer is more than the separation threshold 206, the read pointer is catching up to the write pointer and characters need to be inserted between the write pointer and the read pointer 218. In the insert characters state 218, the system inserts characters until the separation threshold between the write and read pointers is reached 208. One process to insert characters is to not increment the read pointer until the separation threshold is met. In order to avoid data corruption issues, the read pointer is not incremented only when the read pointer is pointing at a null character value. Once the separation threshold is reached 208, the system returns to the normal operational state 216 and a data item is written to the elasticity FIFO queue on each write clock cycle, and a data item is read from the elasticity FIFO queue on each on each read clock cycle.

Figure 3:
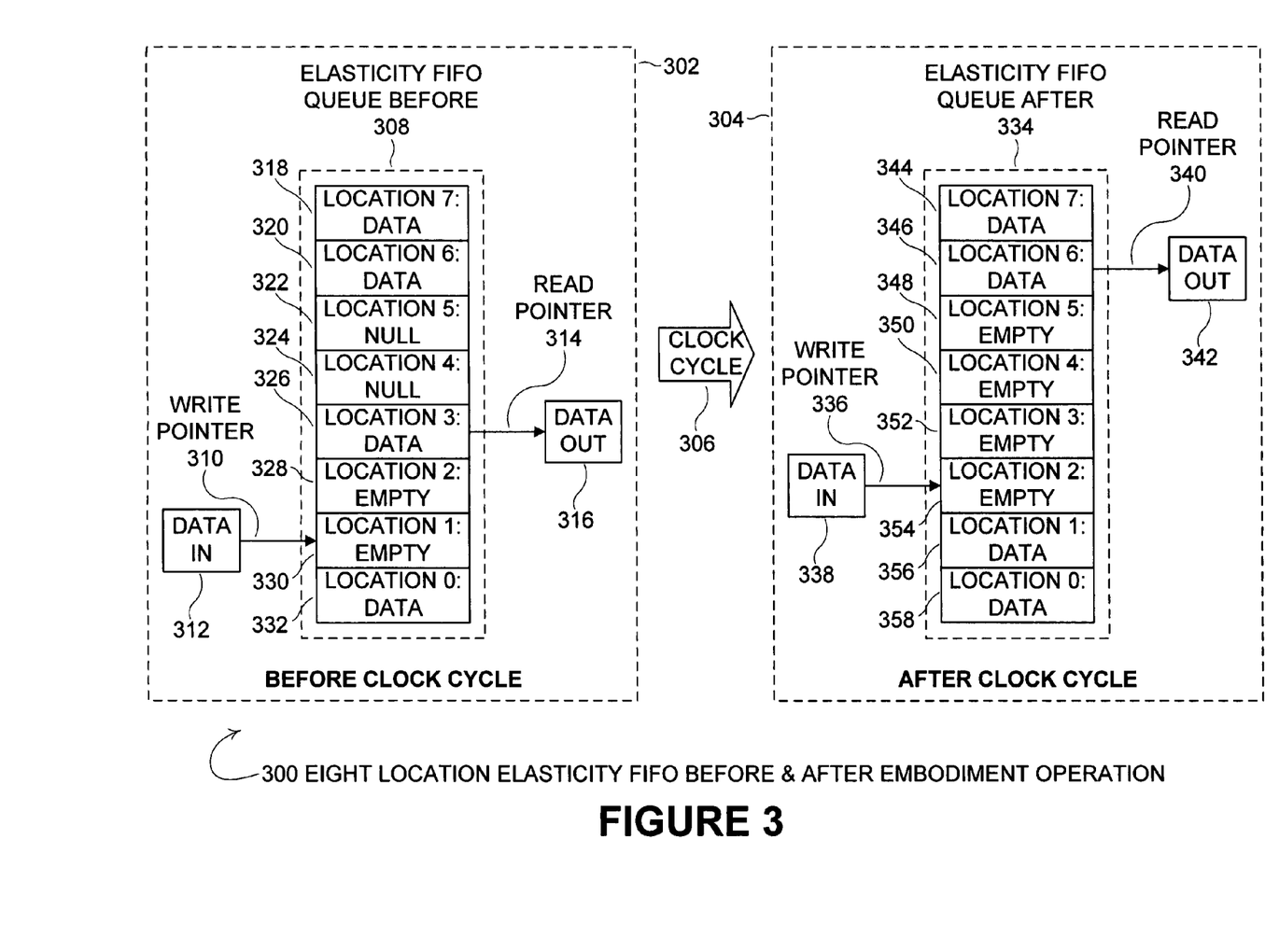
FIG. 3 is a schematic illustration of an eight location elasticity FIFO queue before and after the operation of an embodiment.

FIG. 3 is a schematic illustration 300 of an eight location elasticity FIFO queue before 308 and after 334 the operation of an embodiment. In the embodiment illustrated in FIG. 3, the elasticity queue 308, 334 has eight locations 318-332, 344-358, each location 318-332, 344-358 holding eight bits of data, or a data character. An eight bit data character is a common data size, but a queue location 318-332, 344-358 may be any size and is not limited to eight bits. Also, the eight locations 318-332, 344-358 of the elasticity FIFO queue 308, 334 are specific to the embodiment illustrated and other embodiments may have any number of data locations as necessary for the needs of the embodiment.

The write pointer 310, 336 initially starts at location 0 (332, 358) and the write data 312, 338 is written into location 0 (332, 358). The write pointer 310, 336 increments to the next successive location after each data item is written into the queue 308, 334 until write data 312, 338 is written into the last location, location 7 (318, 344). After the write data 312, 338 is written into the last location (318, 344), the write pointer 310, 336 returns to the first location, location 0 (332, 358), and repeats the circular process until the system is stopped. A write operation is performed on each write clock cycle. The write clock is usually the clock embedded with the transmitted data signal.

Similarly, the read pointer 314, 340 initially starts at location 0 (332, 358) and the read data 316, 342 is read from location 0 (332, 358). The read process does not begin until the write pointer 310, 336 has reached the separation threshold. Generally, the separation threshold is half the total possible distance between the write pointer 310, 336 and the read pointer 314, 340 possible for the elasticity FIFO queue 308, 334. Defining a different separation threshold for other embodiments is possible as well. For the embodiment illustrated in FIG. 3, the separation threshold is 3 locations between the write pointer 310, 336 and the read pointer 314, 340. The read pointer 314, 340 increments to the next successive location after each data item is read from the queue 308, 334 until the read data 316, 342 is read from the last location, location 7 (318, 344). After read data 316, 342 is read from the last location (318, 344), the read pointer 314, 340 returns to the first location, location 0 (332, 358) and repeats the circular process until the system is stopped. A read operation is performed on each read clock cycle. The read clock is usually the internal clock of the receiver device.

In the initial system state 302 before a clock cycle 306, the elasticity FIFO queue 308 has the write pointer 310 catching up to the read pointer 314. There is only one queue location, location 2 (328), between the write pointer 310 and the read pointer 314. The values in locations 3 (326), 4 (324), 5, (322), 6 (320), 7 (318), and 0 (332) contain data written from the transmitted signal, but not yet read by the receiver. The data in locations 1 (330) and 2 (328) have been read by the receiver and are considered empty. The transmitted data stored in locations 4 (324) and 5 (322) are null characters, thus, locations 4 (324) and 5 (322) do not have valid data to pass to the receiver. Locations 3 (326), 6 (320), 7 (318), and 0 (332) contain valid data that needs to be passed to the receiver.

On a clock cycle 306 the embodiment performs operations to adjust the elasticity FIFO queue 308, 334 so that the read pointer 314, 340 is able to catch back up with the write pointer 310, 336. The clock cycle 306 triggering the queue 308, 334 adjustment may be either the read clock cycle, the write clock cycle, or both clock cycles. The embodiment first performs normal system operations by writing the data in 312 to location 1 (356) and incrementing the write pointer 336 to point at the empty location 2 (354). As part of the normal operation the data in location 3 (326) is read as data out (316) to the receiver, and then location 3 (352) is marked as empty. The embodiment adjustment operation skips the null data in locations 4 (324) and 5 (322) and moves the read pointer 314, 340 to the first valid data location, location 6 (320, 346). After the clock cycle 304, the embodiment has reached the separation threshold level and the system may proceed under normal operation.

In order to skip the null locations 324, 322, the null locations 324, 322 must start at the location 324 that the read pointer 314 is going to read next. The read pointer 314, 340 is only adjusted by enough locations to reach the separation threshold between the write pointer 310, 336 and the read pointer 314, 340. If there are extra consecutive null locations the read pointer 314, 340 does not skip the extra null locations, since the goal is to be at the separation threshold, not over or under the separation threshold. If there are fewer consecutive null locations than are needed to reach the separation threshold, the system adjusts the read pointer 314, 340 to skip as many consecutive null locations as are available in the elasticity queue 308, 334, even if the operation only partially adjusts the read pointer 314, 340 to meet the desired separation threshold. The adjustment operation is performed each clock cycle so null locations not consecutive with the current read pointer may be removed on future clock cycles to achieve the desired separation threshold.

Figure 4:
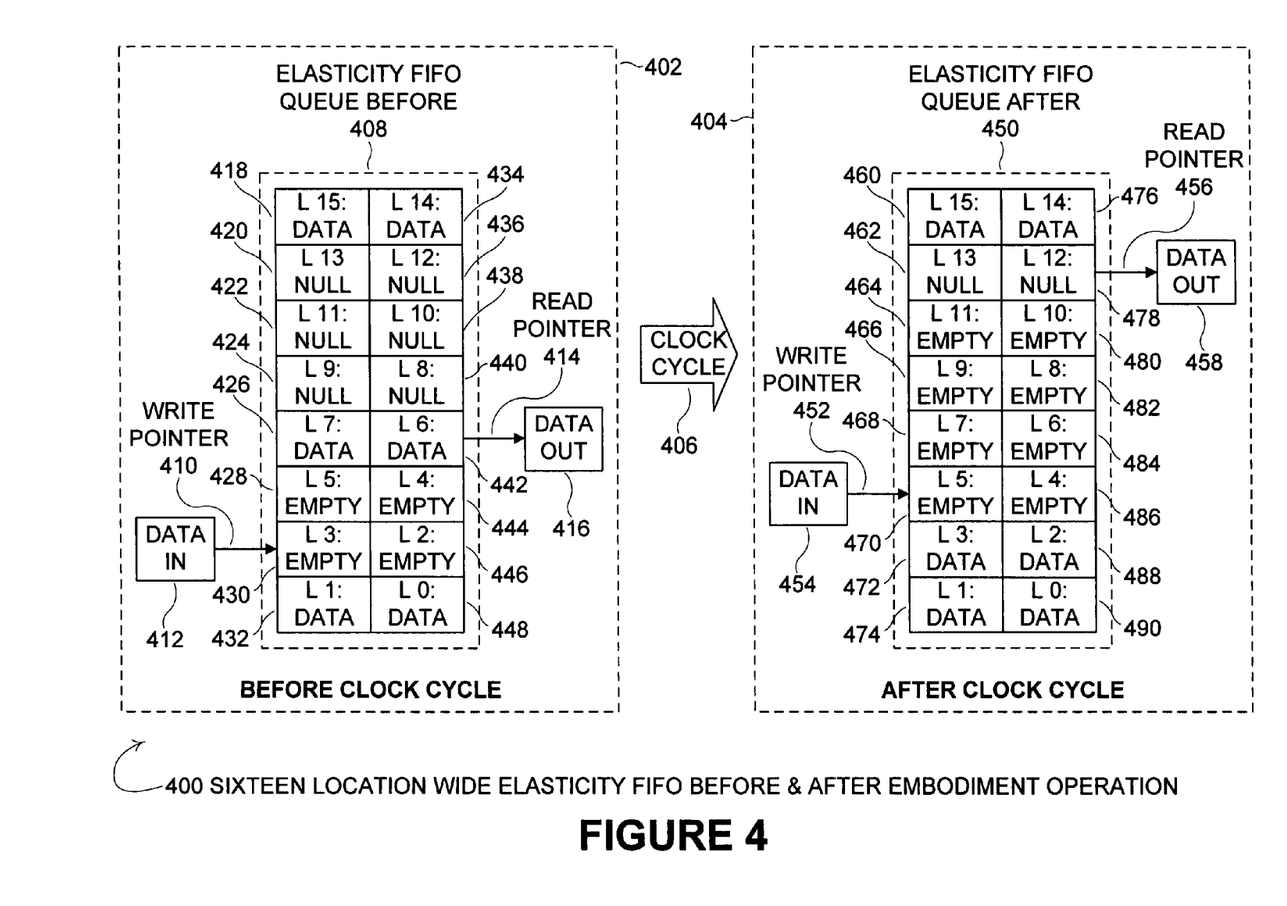
FIG. 4 is a schematic illustration of a sixteen location wide elasticity FIFO queue before and after the operation of an embodiment.

FIG. 4 is a schematic illustration 400 of a sixteen location wide elasticity FIFO queue before 408 and after 450 the operation of an embodiment. In the embodiment illustrated in FIG. 4, the elasticity queue 408, 450 has sixteen locations 418-448, 460-490, each location 418-448, 460-490 holding eight bits of data, or a data character. An eight bit data character is a common data size, but a queue location 418-448, 460-490 may be any size and is not limited to eight bits. Also, the sixteen locations 418-448, 460-490 of the elasticity FIFO queue 408, 450 are specific to the embodiment illustrated and other embodiments may have any number of data locations as necessary for the needs of the embodiment.

The embodiment in FIG. 4 has a wide elasticity queue 408, 450. In a wide queue the write pointer 410, 452 and read pointer 414, 456 address multiple side-by-side queue locations. In the embodiment shown in FIG. 4 there are two side-by-side queue locations addressed by the write 410, 452 and read 414, 456 pointers. The write pointer 410, 452 and read pointer 414, 456 operate in a similar circular pattern as described in the description with respect to FIG. 3, except that when the write pointer 410, 452 or read pointer 414, 456 is incremented, the pointer is changed by a value of two instead of one. In most respects the operation of the embodiment illustrated in FIG. 4 is the same as the operation as described with respect to FIG. 3, except that operations are performed on a two character wide data value instead of a single character wide data value.

The write pointer 410, 452 initially starts at location 1/0 (432, 474/448, 490) and the write data 412, 454 is written into location 1/0 (432, 474/448, 490). The write pointer 410, 452 increments to the next successive location after each data item is written into the queue 408, 450 until write data 412, 454 is written into the last location, location 15/14 (418/434, 460/476). After the write data 412, 454 is written into the last location (418/434, 460/476), the write pointer 410, 452 returns to the first location, location 1/0 (432, 474/448, 490), and repeats the circular process until the system is stopped. A write operation is performed on each write clock cycle. The write clock is usually the clock embedded with the transmitted data signal.

Similarly, the read pointer 414, 456 initially starts at location 1/0 (432/448, 464/490) and the read data 416, 458 is read from location 1/0 (432/448, 474/490). The read process does not begin until the write pointer 410, 452 has reached the separation threshold. Generally, the separation threshold is half the total possible distance between the write pointer 410, 452 and the read pointer 414, 456 possible for the elasticity FIFO queue 408, 450. For the embodiment illustrated in FIG. 4 the separation threshold is 6 locations between the write pointer 410, 452 and the read pointer 414, 456. Defining a different separation threshold for other embodiments is possible as well. The read pointer 414, 456 increments to the next successive location after each data item is read from the queue 408, 450 until the read data 416, 458 is read from the last location, location 15/14 (418, 460/434, 476). After read data 416, 458 is read from the last location (418, 460/434, 476), the read pointer 414, 456 returns to the first location, location 1/0 (432/448, 474/490) and repeats the circular process until the system is stopped. A read operation is performed on each read clock cycle. The read clock is usually the internal clock of the receiver device.

In the initial system state 402 before a clock cycle 406, the elasticity FIFO queue 408 has the write pointer 410 catching up to the read pointer 414. There are only two queue locations, location 5/4 (428/444), between the write pointer 410 and the read pointer 414. The values in locations 7/6 (426/442), 9/8 (424/440), 11/10, (422/438), 13/12 (420/436), 15/14 (418/434), and 1/0 (432/448) contain data written from the transmitted signal, but not yet read by the receiver. The data in locations 3/2 (430/446) and 5/4 (428/444) have been read by the receiver and are considered empty. The transmitted data stored in locations 9/8 (424/440), 11/10 (422/438), and 13/12 (420/436) are null characters, thus, locations 9/8 (424/440), 11/10 (422/438), and 13/12 (420/436) do not have valid data to pass to the receiver. Locations 7/6 (426/442), 15/14 (418/434), and 1/0 (432/448) contain valid data that needs to be passed to the receiver.

On a clock cycle 406 the embodiment performs operations to adjust the elasticity FIFO queue 408, 450 so that the read pointer 414, 456 is able to catch back up with the write pointer 410, 452. The clock cycle 406 triggering the queue 408, 450 adjustment may be either the read clock cycle, the write clock cycle, or both clock cycles. The embodiment first performs normal system operations by writing the data in 412 to location 3/2 (472/488) and incrementing the write pointer 452 to point at the empty location 5/4 (470/486). As part of the normal operation the data in locations 7/6 (426/442) are read as data out (416) to the receiver, and then locations 7/6 (426/442) are marked as empty. The embodiment adjustment operation skips the null data in locations 9/8 (424/440) and 11/10 (422/438) and moves the read pointer 414, 456 to the first valid data locations, locations 13/12 (420/436, 462/478). After the clock cycle 304, the embodiment has reached the separation threshold level and the system may proceed under normal operation.

In order to skip the null locations 424/440, 422/438, 420/436 the null locations 424, 440, 422, 438, 420, 436 must start at the location 424/440 that the read pointer 414 is going to read next. The read pointer 414, 456 is only adjusted by enough locations to reach the separation threshold between the write pointer 410, 452 and the read pointer 414, 456. If there are extra consecutive null locations 420/436, 462/478 the read pointer 414, 456 does not skip the extra null locations 420/436, 462/478, since the goal is to be at the separation threshold, not over or under the separation threshold. The read pointer 456 is set to read the extra null data characters stored in queue locations 13/12 (462/478) as locations 13/12 (462/478) are the locations that match the defined separation threshold. If there are fewer consecutive null locations than are needed to reach the separation threshold, the system adjusts the read pointer 414, 456 to skip as many consecutive null locations as are available in the elasticity queue 408, 450, even if the operation only partially adjusts the read pointer 408, 450 to meet the desired separation threshold. The adjustment operation is performed each clock cycle so null locations not consecutive with the current read pointer may be removed on future clock cycles to achieve the desired separation threshold.

Figure 5:
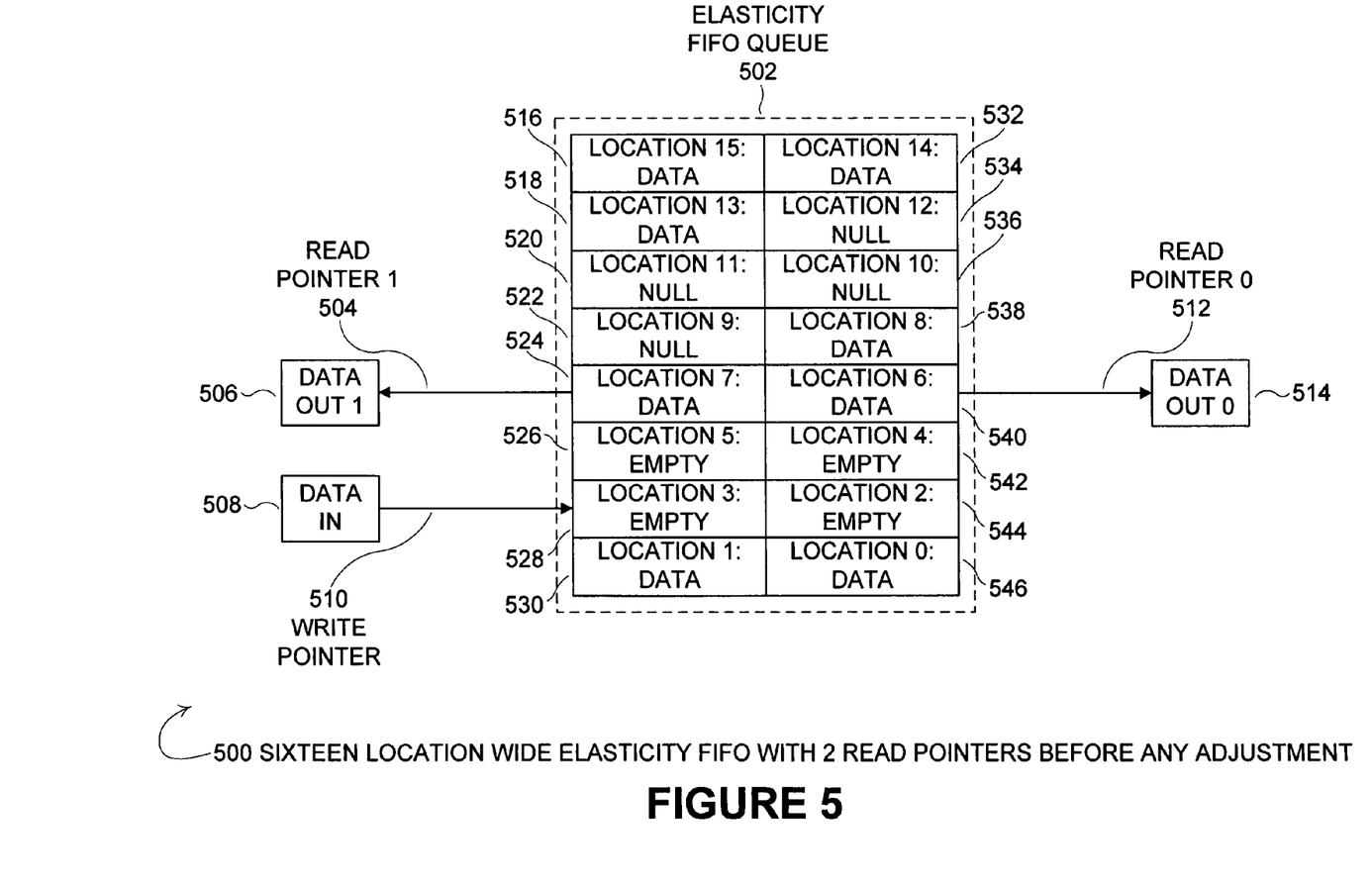
FIG. 5 is a schematic illustration of a sixteen location wide elasticity FIFO queue with two read pointers before the operation of an embodiment.
Figure 6:
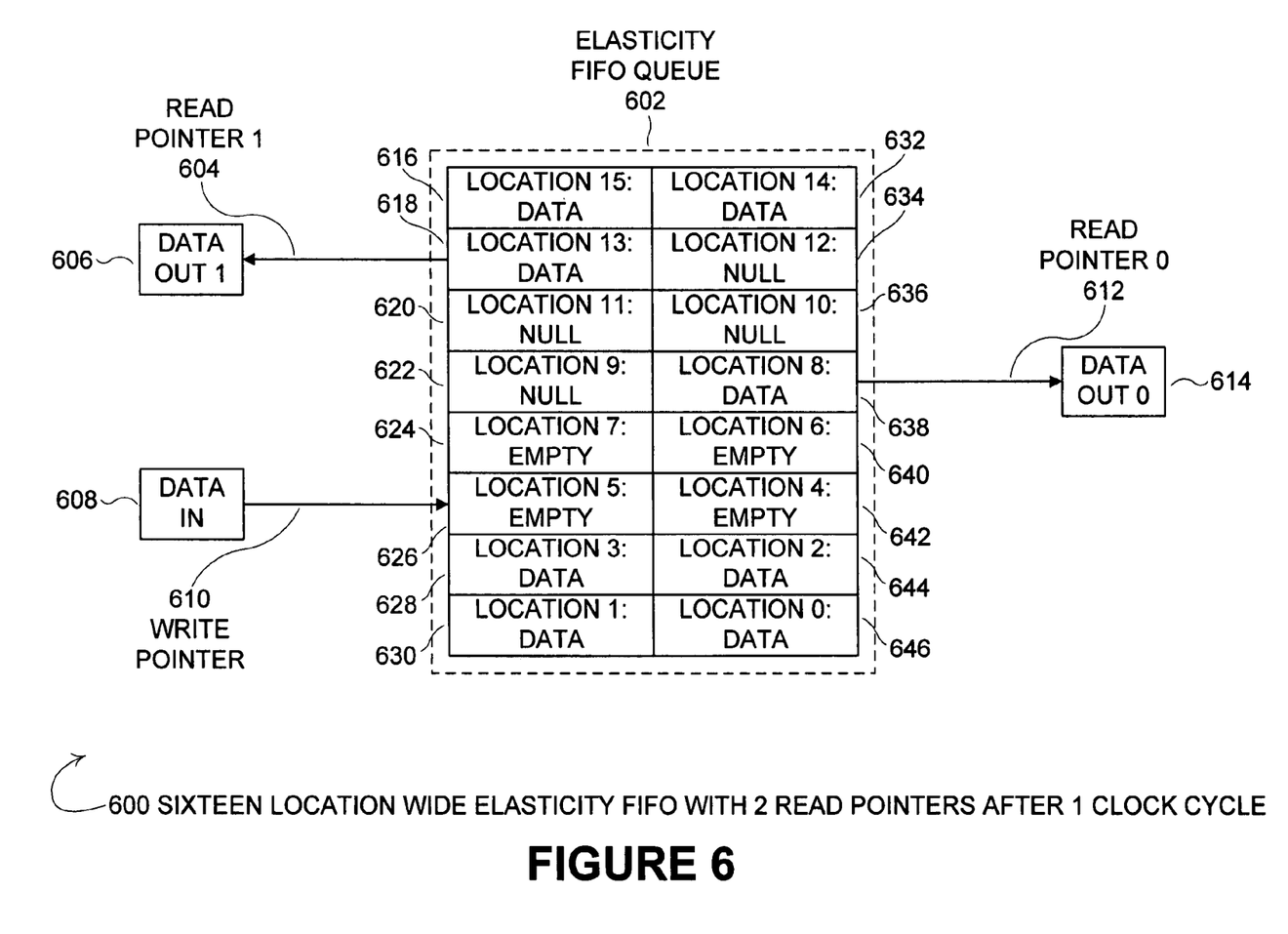
FIG. 6 is a schematic illustration of a sixteen location wide elasticity FIFO queue with two read pointers after the operation of an embodiment for one clock cycle.
Figure 7:
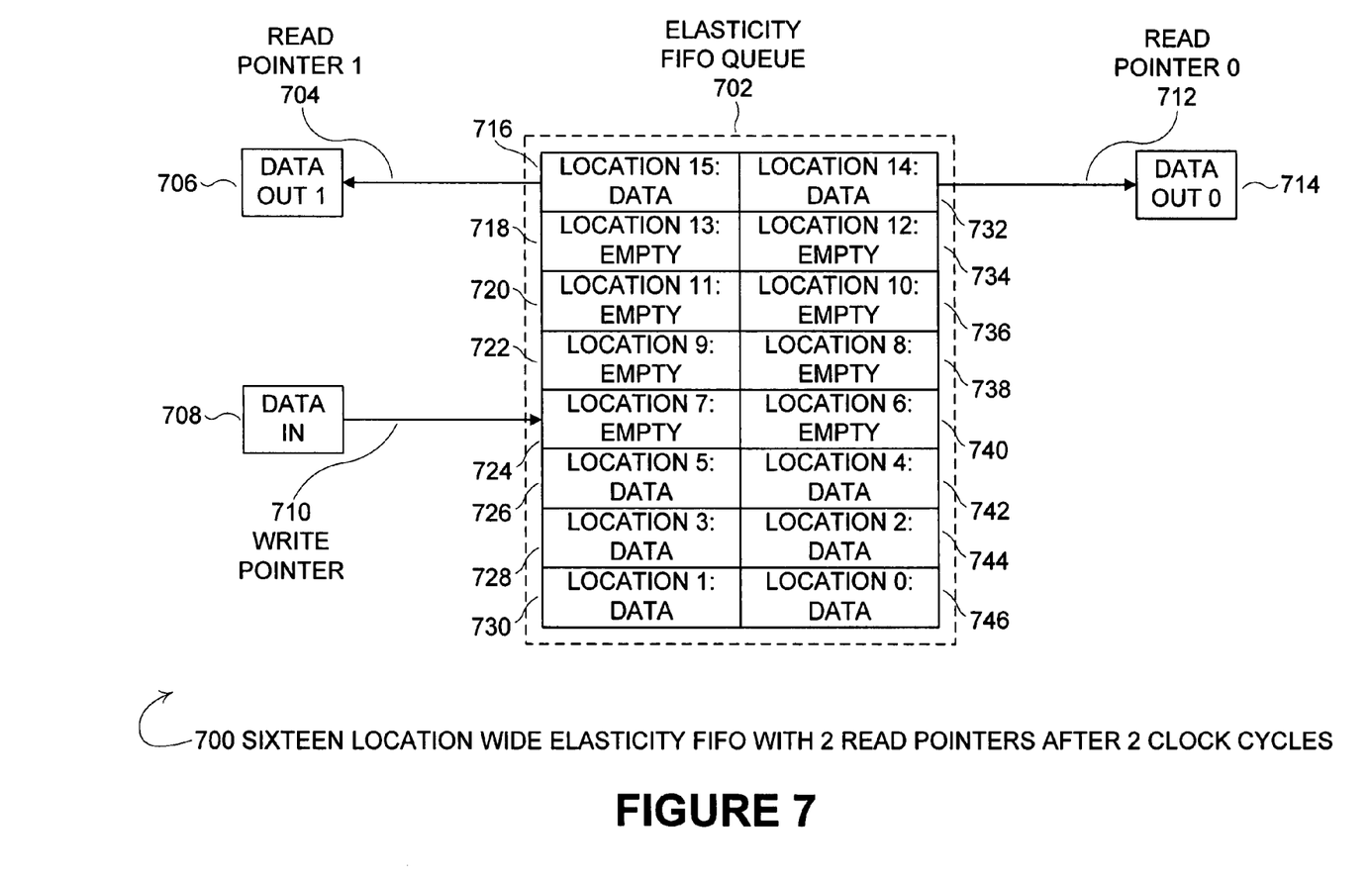
FIG. 7 is a schematic illustration of a sixteen location wide elasticity FIFO queue with two read pointers after the operation of an embodiment for two clock cycles.

FIG. 5 is a schematic illustration 500 of a sixteen location wide elasticity FIFO queue 502 with two read pointers 504, 512 before the operation of an embodiment. The operation of the embodiment illustrated in FIGS. 5, 6, and 7 is nearly identical to the operation of the embodiment described with respect to FIG. 4. The primary difference is that the embodiment in FIGS. 5, 6, and 7 has two read pointers 504, 512. Only one read pointer, read pointer 0 (512) is necessary under normal operations since the two read pointers 504, 512 point to side-by-side data locations in the queue 502 under normal operation. In the initial state of the embodiment shown in FIGS. 5, 6, and 7 the write pointer is only two locations (526, 540) away from read pointer 0 (512), which is well under the separation threshold of 6 for the embodiment illustrated. The empty data locations are location 2 (544), 3 (528), 4 (542), and 5 (526). The write pointer 510 is specifying location 3/2 (528/544) for the destination for the two character wide data in 508. Data written from transmitted data, but not yet read are in locations 6 (540), 7 (524), 8 (538), 9 (522), 10 (536), 11 (520), 12 (534), 13, (518), 14 (532), 15 (516), 0 (546), and 1 (530). Null data appears in locations 9 (522), 10 (536), 11 (520), and 12 (534). Read pointer 0 (512) specifies that half of the data out, data out 0 (514), will come from location 6 (540). Read pointer 1 (504) specifies that the other half of the data out, data out 1 (506) will come from location 7 (524).

FIG. 6 is a schematic illustration 600 of a sixteen location wide elasticity FIFO queue 602 with two read pointers 604, 612 after the operation of an embodiment for one clock cycle. The initial state of the embodiment illustrated in FIG. 6 is contained in the description with respect to FIG. 5. Only the locations affected by the write and read operation of the embodiment operation for the first clock cycle after the initial state are different than the same locations as described with respect to FIG. 5. Hence, locations 8 (638), 9 (622), 10 (636), 11 (620), 12 (634), 13, (618), 14 (632), 15 (616), 0 (646), and 1 (630) still contain data written to the queue 602, but not yet read by the receiver. Null data still appears in locations 9 (622), 10 (636), 11 (620), and 12 (634) and locations 4 (642) and 5 (626) are still empty. Data in 608 has been written into locations 2 (644) and 3 (626). Data out 0 (614) has been read from location 6 (640), so location 6 (640) is now empty. Data out 1 (606) has been read from location 7 (624), so location 7 (624) is now empty. The write pointer has been incremented and is now pointing at locations 5/4 (626/642). Read pointer 0 (612) has been incremented to the next non-null data location at location 8 (638). Read pointer 1 (604) has skipped the null locations 622, 636, 620, 634 and is now pointing at the second non-null data location, location 13 (618). By separating the read pointers 604, 612 the embodiment is able to skip four null characters where two of the null characters 622, 634 are not part of a side-by-side null pair of locations.

FIG. 7 is a schematic illustration 700 of a sixteen location wide elasticity FIFO queue 702 with two read pointers 704, 712 after the operation of an embodiment for two clock cycles. After the second clock cycle the two read pointers 704, 712 are once again pointing to side-by-side locations 716, 732 and the null data has been changed to empty locations in locations 9 (722), 10 (736), 11 (720), and 12 (734). The distance between the write pointer 710 and read pointer 0 (712) is now at the separation threshold of 6 locations. The write pointer 710 is preparing to write the two character wide data in 708 to locations 7/6 (724/740) on the next clock cycle and the read pointers are preparing to read data out 0 (714) and data out 1 (706) from the first non-empty data locations, location 14 (732) and 15 (716), respectively. Data characters written but not yet read are contained in eight locations 732, 716, 746, 730, 744, 728, 742, 726. There are an equal number of eight empty locations 740, 724, 738, 722, 736, 720, 734, 718 ready to accept new written data. By splitting the read pointers 704, 712 in the embodiment illustrated in FIGS. 5, 6, and 7, the embodiment is able to take advantage of all consecutive null data locations and is able to return to a normal state with a proper separation between the write pointer 710 and read pointer 0 (712) in one operation.

For the embodiment described in FIGS. 5, 6, and 7 a queue location may hold one or more data characters. The two read pointers, read pointer zero and read pointer one specify an individual location made up of one or more characters. A data character is typically an eight bit value, but may consist of any number of bits desired for the system. Each data character in a null location is a null data character.

Various embodiments therefore provide the ability to remove one or more null characters from an elasticity FIFO queue during a single clock cycle when it is detected that the write pointer is catching up to the read pointer. By skipping multiple null characters during a single write cycle an embodiment moves the read pointer ahead by one or more queue locations and ensures that the write pointer will not catch up to the read pointer for a wider variation in frequencies between a transmitter and receiver than is normally possible. Typically, the elasticity FIFO queue size must be increased in order to support a larger frequency variation. By reducing the need to increase the elasticity FIFO queue size, the gate count and area needed for the elasticity FIFO queue on the silicon chip of the receiver is reduced, thus, reducing the cost contribution of the elasticity FIFO queue to the receiver device. Skipping null characters also reduces the latency time between a write and the associated read of a non-null data character.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of minimizing elasticity FIFO queue size for synchronizing data between two clock domains comprising:
    writing a data block to a write location specified by a write pointer of said elasticity FIFO queue on each write clock cycle of a write clock;
    reading said data block from a read location specified by a read pointer of said elasticity FIFO queue on each read clock cycle of a read clock, said read location being behind said write location in said elasticity FIFO queue; and
    performing adjustment clock tasks on each adjustment clock cycle of an adjustment clock, said adjustment clock tasks further comprising:
        calculating a separation number of locations between said write pointer and said read pointer, said separation number of locations being a count of locations that said write location would need to catch up to said read location;
        calculating a correction number of locations, said correction number of locations being the greater of zero and a separation threshold number of locations subtracted from said separation number of locations;
        searching said elasticity FIFO queue for consecutive null locations, said consecutive null locations starting at said read location and ending at a last consecutive null location, each location of said consecutive null locations containing a null character; and
        adjusting said read pointer to specify an adjusted read location, said adjusted read location being one location after skipped locations, said skipped locations being a subgroup of said consecutive null locations starting at a first null location of said consecutive null locations and continuing for the lesser of said correction number of locations and a total count of said consecutive locations.

2. The method of minimizing elasticity FIFO queue size for synchronizing data between two clock domains of claim 1 wherein said adjustment clock is any of the group comprising: said write clock, and said read clock.

3. The method of minimizing elasticity FIFO queue size for synchronizing data between two clock domains of claim 1 wherein said separation threshold number of locations is equal to one half of the total possible locations that may separate said write location and said read location of said elasticity FIFO queue.

4. The method of minimizing elasticity FIFO queue size for synchronizing data between two clock domains of claim 1 wherein said elasticity FIFO queue is a wide queue, said data block of said wide queue being split into multiple character data blocks, each of said multiple character data blocks being capable of holding a single data character and said null data location containing said null data character in each of said multiple character data blocks.

5. The method of minimizing elasticity FIFO queue size for synchronizing data between two clock domains of claim 1 wherein said elasticity FIFO queue is a wide queue, said data block of said wide queue being split into two sub data blocks, each of said two sub data blocks being capable of holding a single data character, said write pointer specifying said write location comprising both of said two sub data blocks, said read pointer being split into a read pointer zero and a read pointer one, said read pointer zero specifying a read zero sub data block, said read pointer one specifying a read one sub data block, said read zero data block and read one data block combining to make up said read location, said null data location being a null sub data block, said null sub data block containing said null character, said null sub data block being one of said two sub data blocks of a location of said elasticity FIFO queue, said consecutive null locations being consecutive null sub data blocks contained in consecutive sub data blocks of said elasticity FIFO queue, said consecutive sub data blocks being capable of including only one of said two sub data blocks and both of said two sub data blocks of a location of said elasticity FIFO queue.

6. The method of minimizing elasticity FIFO queue size for synchronizing data between two clock domains of claim 5 wherein said sub data block consists of multiple characters of data and each said data character of said null sub data block is said null character.

7. The method of minimizing elasticity FIFO queue size for synchronizing data between two clock domains of claim 1 further comprising:
    updating said write pointer to specify a next write location of said elasticity FIFO queue on each said write clock cycle, said write pointer initially specifying a first location of said elasticity FIFO queue and progressing through each of said multiple data locations until said write pointer specifies a last location of said elasticity FIFO queue, when said write pointer specifies said last location said next write location becomes said first location such that said write pointer progresses through said multiple data locations of said elasticity FIFO queue in a repetitive circular fashion; and
    updating said read pointer to specify a next read location of said elasticity FIFO queue on each said read clock cycle, said read pointer initially waiting for said write pointer to get ahead by said separation threshold number of locations, then said read pointer specifying said first location of said elasticity FIFO queue and progressing through each of said multiple data locations until said read pointer specifies said last location of said elasticity FIFO queue, when said read pointer specifies said last location said next read location becomes said first location such that said read pointer progresses through said multiple data locations of said elasticity FIFO queue in said repetitive circular fashion.

8. The method of minimizing elasticity FIFO queue size for synchronizing data between two clock domains of claim 1 wherein said data block is a character of transmitted data and said null data character is a throw away data character of said transmitted data, said transmitted data being data from a transmitter formatted according to a standard communication protocol.

9. The method of minimizing elasticity FIFO queue size for synchronizing data between two clock domains of claim 8 wherein said write clock is obtained from an embedded clock signal contained in said transmitted data signal.

10. The method of minimizing elasticity FIFO queue size for synchronizing data between two clock domains of claim 8 wherein said standard communication protocol is one of the group comprising: RapidIO, InfiniBand, Advanced Switching Interconnect, System Packet Interface, Fibre Channel, Serial Attached SCSI (SAS), Serial Advanced Technology Attachment (SATA), any serial communication protocol with an embedded clock signal, any parallel communication protocol with an embedded clock signal, and any parallel communication protocol with a separate clock channel.

11. A receiver for minimizing elasticity FIFO queue size for synchronizing data between two clock domains comprising:
   a write data subsystem that writes a data block to a write location specified by a write pointer of said elasticity FIFO queue on each write clock cycle of a write clock;
   a read data subsystem that reads said data block from a read location specified by a read pointer of said elasticity FIFO queue on each read clock cycle of a read clock, said read location being behind said write location in said elasticity FIFO queue; and
   an adjustment clock subsystem that runs each adjustment clock cycle of an adjustment clock, said adjustment clock subsystem further comprising:
      a calculate separation subsystem that calculates a separation number of locations between said write pointer and said read pointer, said separation number of locations being a count of locations that said write location would need to catch up to said read location;
      a calculate correction subsystem that calculates a correction number of locations, said correction number of locations being the greater of zero and a separation threshold number of locations subtracted from said separation number of locations;
      a null search subsystem that searches said elasticity FIFO queue for consecutive null locations, said consecutive null locations starting at said read location and ending at a last consecutive null location, each location of said consecutive null locations containing a null character; and
      an adjust read pointer subsystem that adjusts said read pointer to specify an adjusted read location, said adjusted read location being one location after skipped locations, said skipped locations being a subgroup of said consecutive null locations starting at a first null location of said consecutive null locations and continuing for the lesser of said correction number of locations and a total count of said consecutive locations.

12. The receiver for minimizing elasticity FIFO queue size for synchronizing data between two clock domains of claim 11 wherein said adjustment clock is any of the group comprising: said write clock, and said read clock.

13. The receiver for minimizing elasticity FIFO queue size for synchronizing data between two clock domains of claim 11 wherein said separation threshold number of locations is equal to one half of the total possible locations that may separate said write location and said read location of said elasticity FIFO queue.

14. The receiver for minimizing elasticity FIFO queue size for synchronizing data between two clock domains of claim 11 wherein said elasticity FIFO queue is a wide queue, said data block of said wide queue being split into multiple character data blocks, each of said multiple character data blocks being capable of holding a single data character and said null data location containing said null data character in each of said multiple character data blocks.

15. The receiver for minimizing elasticity FIFO queue size for synchronizing data between two clock domains of claim 11 wherein said elasticity FIFO queue is a wide queue, said data block of said wide queue being split into two sub data blocks, each of said two sub data blocks being capable of holding a single data character, said write pointer specifying said write location comprising both of said two sub data blocks, said read pointer being split into a read pointer zero and a read pointer one, said read pointer zero specifying a read zero sub data block, said read pointer one specifying a read one sub data block, said read zero data block and read one data block combining to make up said read location, said null data location being a null sub data block, said null sub data block containing said null character, said null sub data block being one of said two sub data blocks of a location of said elasticity FIFO queue, said consecutive null locations being consecutive null sub data blocks contained in consecutive sub data blocks of said elasticity FIFO queue, said consecutive sub data blocks being capable of including only one of said two sub data blocks and both of said two sub data blocks of a location of said elasticity FIFO queue.

16. The receiver for minimizing elasticity FIFO queue size for synchronizing data between two clock domains of claim 15 wherein said sub data block consists of multiple characters of data and each, said data character of said null sub data block is said null character.

17. The receiver for minimizing elasticity FIFO queue size for synchronizing data between two clock domains of claim 11 further comprising:
   an update write pointer subsystem that specifies a next write location of said elasticity FIFO queue on each said write clock cycle, said write pointer initially specifying a first location of said elasticity FIFO queue and progressing through each of said multiple data locations until said write pointer specifies a last location of said elasticity FIFO queue, when said write pointer specifies said last location said next write location becomes said first location such that said write pointer progresses through said multiple data locations of said elasticity FIFO queue in a repetitive circular fashion; and
   an update read pointer subsystem that specifies a next read location of said elasticity FIFO queue on each said read clock cycle, said read pointer initially waiting for said write pointer to get ahead by said separation threshold number of locations, then said read pointer specifying said first location of said elasticity FIFO queue and progressing through each of said multiple data locations until said read pointer specifies said last location of said elasticity FIFO queue, when said read pointer specifies said last location said next read location becomes said first location such that said read pointer progresses through said multiple data locations of said elasticity FIFO queue in said repetitive circular fashion.

18. The receiver for minimizing elasticity FIFO queue size for synchronizing data between two clock domains of claim 11 wherein said data block is a character of transmitted data and said null data character is a throw away data character of said transmitted data, said transmitted data being data from a transmitter formatted according to a standard communication protocol.

19. The receiver for minimizing elasticity FIFO queue size for synchronizing data between two clock domains of claim 18 wherein said write clock is obtained from an embedded clock signal contained in said transmitted data signal.

20. A receiver for minimizing elasticity FIFO queue size for synchronizing data between two clock domains comprising:

means for writing a data block to a write location specified by a write pointer of said elasticity FIFO queue;

means for reading said data block from a read location specified by a read pointer of said elasticity FIFO queue;

means for calculating a separation number of locations between said write pointer and said read pointer;

means for calculating a correction number of locations for said elasticity FIFO queue;

means for searching said elasticity FIFO queue for consecutive null locations; and means for adjusting said read pointer to specify an adjusted read location, said adjusted read location skipping up to said correction number of locations from said consecutive null locations.

* * * * *